(12) United States Patent
Spour (10) Patent No.: US 12,296,883 B2
(45) Date of Patent: May 13, 2025

(54) STROLLER FRAME, STROLLER AND COMPUTER-READABLE STORAGE MEDIUM

(71) Applicant: CYBEX GmbH, Bayreuth (DE)

(72) Inventor: Jiri Spour, Zlatniky-Hodkovice (CZ)

(73) Assignee: CYBEX GmbH, Bayreuth (DE)

( * ) Notice: Subject to any disclaimer, the term of this patent is extended or adjusted under 35 U.S.C. 154(b) by 425 days.

(21) Appl. No.: 17/597,650

(22) PCT Filed: Jul. 16, 2020

(86) PCT No.: PCT/EP2020/070090
§ 371 (c)(1),
(2) Date: Jan. 15, 2022

(87) PCT Pub. No.: WO2021/009270
PCT Pub. Date: Jan. 21, 2021

(65) Prior Publication Data
US 2022/0315088 A1 Oct. 6, 2022

(30) Foreign Application Priority Data
Jul. 16, 2019 (DE) ..................... 20 2019 103 919.1

(51) Int. Cl.
*B62B 7/00* (2006.01)
*B62B 5/00* (2006.01)
(Continued)

(52) U.S. Cl.
CPC .......... *B62B 5/0073* (2013.01); *B62B 5/0033* (2013.01); *B62B 7/06* (2013.01);
(Continued)

(58) Field of Classification Search
CPC ....... B62B 5/0073; B62B 5/0033; B62B 7/06; B62B 9/08; B62B 9/20; B62B 9/00;
(Continued)

(56) References Cited

U.S. PATENT DOCUMENTS

| 6,545,437 B1* | 4/2003 | Strothmann ............. B62M 6/45 |
| | | 318/599 |
| 2007/0170675 A1 | 7/2007 | Yeh |

(Continued)

FOREIGN PATENT DOCUMENTS

| CN | 103818422 A | 5/2014 |
| CN | 103287475 B | 6/2015 |

(Continued)

OTHER PUBLICATIONS

"International Application No. PCT/EP2020/070090, International Search Report and Written Opinion mailed Oct. 14, 2020", (Oct. 14, 2020), 12 pgs.

(Continued)

*Primary Examiner* — Shardul D Patel
(74) *Attorney, Agent, or Firm* — Schwegman Lundberg & Woessner, P.A.

(57) ABSTRACT

The invention relates to a stroller frame, comprising a sensor unit for capturing sensor data and a drive unit comprised of a computing unit, which is designed to switch the drive unit between a driving state and a non-driving state according to the time curve of the sensor data.

22 Claims, 5 Drawing Sheets

(51) Int. Cl.
  *B62B 7/06* (2006.01)
  *B62B 9/08* (2006.01)
  *B62B 9/20* (2006.01)
  *G01L 5/00* (2006.01)

(52) U.S. Cl.
  CPC ............... *B62B 9/08* (2013.01); *B62B 9/20* (2013.01); *G01L 5/00* (2013.01)

(58) Field of Classification Search
  CPC   B62B 5/0069; B62B 9/10; B62B 7/00; G01L 5/00
  USPC .......................................................... 701/22
  See application file for complete search history.

(56) References Cited

U.S. PATENT DOCUMENTS

| | | | | |
|---|---|---|---|---|
| 2008/0047764 | A1* | 2/2008 | Lee ....................... | G06F 3/0418 178/18.06 |
| 2008/0047766 | A1* | 2/2008 | Seymour ................. | B60L 53/80 180/65.1 |
| 2014/0358344 | A1* | 12/2014 | Katayama ............. | B62B 5/0073 701/22 |
| 2016/0101803 | A1 | 4/2016 | Ahlemeier | |
| 2017/0001656 | A1* | 1/2017 | Katayama ................ | A61H 3/04 |
| 2017/0088157 | A1 | 3/2017 | Young et al. | |
| 2017/0129523 | A1* | 5/2017 | Hane ...................... | B62B 5/0414 |
| 2018/0208226 | A1* | 7/2018 | Tse ........................ | B62B 5/0053 |
| 2021/0016816 | A1* | 1/2021 | Schillinger ............ | B62B 5/0033 |
| 2021/0078624 | A1* | 3/2021 | Powell ..................... | B60K 1/00 |

FOREIGN PATENT DOCUMENTS

| | | |
|---|---|---|
| CN | 105172868 A | 12/2015 |
| CN | 108275189 A | 7/2018 |
| CN | 109922770 A | 6/2019 |
| DE | 29901834 U1 | 4/1999 |
| DE | 19755309 A1 | 6/1999 |
| DE | 102013224885 A1 | 6/2015 |
| DE | 202017104166 U1 | 10/2018 |
| EP | 2808000 A1 | 12/2014 |
| EP | 2805867 B1 | 5/2017 |
| JP | 2005075043 A | 3/2005 |
| JP | 5442899 B1 | 12/2013 |
| JP | 2014227065 A | 12/2014 |
| JP | 2014230681 A | 12/2014 |
| JP | 2016185235 A | 10/2016 |
| KR | 101399656 B1 | 5/2014 |
| SE | 1750621 A1 | 11/2018 |
| WO | WO-2018210684 A1 | 11/2018 |
| WO | WO-2021009270 A1 | 1/2021 |

OTHER PUBLICATIONS

"Chinese Application No. 202080061508.6, First Office Action mailed Sep. 6, 2023", (Sep. 6, 2023), 20 pgs.
"Chinese Application No. 202080061508.6, Search Report dated Sep. 5, 2023", (Sep. 5, 2023), 5 pgs.
"Japan Application No. 2022-502466, Office Action mailed Jul. 9, 2024", (Jul. 9, 2024), 10 pgs.
"Japanese Application No. 2022-502466, Notice of Reasons for Refusal dated Oct. 21, 2024", (Oct. 21, 2024), 7 pgs.

* cited by examiner

STROLLER FRAME, STROLLER AND COMPUTER-READABLE STORAGE MEDIUM

PRIORITY CLAIM TO RELATED APPLICATIONS

This application is a U.S. national stage filing under 35 U.S.C. § 371 from International Application No. PCT/EP2020/070090, filed on 16 Jul. 2020, and published as WO2021/009270 on 21 Jan. 2021, which claims the benefit under 35 U.S.C. 119 to German Application No. 20 2019 103 919.1, filed on 16 Jul. 2019, the benefit of priority of each of which is claimed herein, and which applications and publication are hereby incorporated herein by reference in their entirety.

The invention relates to a stroller frame, to a stroller, and to a computer-readable storage medium.

Motorized strollers are known in principle. These can be configured in such a way that they can only be moved by motor power. Furthermore, it is known in principle to equip strollers with motor assistance, which assists the driving force of a person operating the stroller but provides no assistance when no force is being exerted by the operator.

In addition, it is necessary to brake the stroller when the operator has no hand on the stroller. This can prevent the stroller from inadvertently rolling away or from continuing onward in an uncontrolled manner.

The prior art contains a range of solutions for detecting whether the operator has a hand on the stroller. For example, it is known from EP 2 805 867 B1 to equip the push handle of a stroller with capacitive sensors that detect a hand.

In the solution of EP 2 805 867 B1, however, there is the disadvantage that an operator who is wearing gloves is not effectively detected.

Furthermore, it is known from DE 299 01 834 U1 to mount a mechanical switch on the handle of a stroller in order to ascertain whether the operator is pushing the stroller. However, this solution has the disadvantage that articles placed on the handle of a stroller, such as jackets for example, can lead to the switch being triggered, so that safe operation of the stroller is not guaranteed.

It is therefore an object of the invention to improve the safety of stroller frames and in particular of strollers. In particular, it is also an object of the invention to improve the detection of whether an operator is gripping a stroller frame or a stroller. In particular, it is also an object of the invention to reduce incorrect detections of contact between operators and a stroller frame or a stroller.

The object is achieved by a stroller frame according to claim 1, a stroller according to claim 15, and a computer-readable storage medium according to claim 16.

In particular, the object is achieved by a stroller frame, comprising:
  a sensor unit for capturing sensor data;
  a drive unit;
wherein a computing unit is provided, which is designed to switch between a driving state and a non-driving state as a function of a curve of the sensor data over time. In particular, the drive unit is designed to switch (from a driving state) to a non-driving state and/or is designed to switch (from a/the non-driving state) to a driving state.

One core concept of the invention is that, in order to determine whether a non-driving state or a driving state should be assumed, a curve of sensor data over time is considered. In this connection, therefore, it is not intended to use only a single point in time or a single sensor signal for switching to the non-driving state or driving state. By taking into account a curve over time, it can be determined whether a substantially static signal or a dynamically changing signal is being detected by the sensor unit. A static signal may indicate that no person is pushing the stroller frame. In contrast, a dynamically changing signal may indicate that a person is pushing the stroller frame. In one embodiment, the non-driving state may be designed as a braking state. A braking state can be characterized in that the stroller frame is actively slowed or brought to a standstill. The non-driving state may also include the case where there is no active driving of the stroller frame, for example an idle mode.

The sensor unit may be, for example, a force sensor or a torque sensor. The sensor unit may be designed to capture the sensor data at a sampling frequency of $\geq 5$ Hz or $\geq 10$ Hz or $\geq 15$ Hz and/or $\leq 200$ Hz or $\leq 100$ Hz.

In one embodiment, the computing unit may be designed to determine at least one reference value for the sensor data, in particular for at least one temporally contiguous subset of the sensor data.

The subset of the sensor data may comprise the sensor data from a particular period of time; by way of example, the temporally contiguous subset of the sensor data may be a 0.5-second portion of the sensor data. It is also conceivable that the period of time is <0.2 seconds, <0.5 seconds, $\leq 0.8$ seconds, $\leq 1$ second, $\leq 2$ seconds and/or $\leq 5$ seconds.

In one embodiment, temporally directly successive subsets may overlap with regard to measured values captured therein. For instance, at least one measured value and at most all the measured values except for one may be captured in both subsets. In one embodiment, it is provided in addition or as an alternative that temporally directly successive subsets do not overlap with regard to measured values captured therein. For instance, none of the measured values contained in one of the subsets can also be captured in the other subset. In particular, temporally directly successive subsets that do not overlap may be designed in such a way that the last measured value captured in the earlier subset is directly followed by the first measured value captured in the later subset.

Forming a reference value has the advantage that the computing unit can carry out the switching as a function of the curve of the sensor data and of the reference value over time. A reference quantity for a subset of the sensor data is thus determined, with which one or more current measured values can be compared. This simplifies the calculation.

In one embodiment, the reference value may indicate a mean value, for example a trimmed mean, a harmonic mean or a weighted harmonic mean.

The reference value may therefore provide a (kind of) summary of the individual sensor values of the contiguous subset of the sensor data. As a result, individual sensor data can be set in relation to the reference value, as a result of which efficient switching to the non-driving state or driving state is possible. In one embodiment, the sensor data may indicate a plurality of measured values, each of which can be associated with a recording time.

To efficiently store the sensor data, each of the measured values may be associated with a recording time. As a result, it is not necessary to store the measured values in a certain order in a data structure. It is therefore also possible to store the measured values in any desired data structure since the chronological order can be restored by means of the times.

For the storage, however, it is also possible to use a data structure which may have a fixed size and may for example be designed to store at least or exactly the number of measured values contained in one subset. The data structure may operate according to the FIFO (First In-First Out) principle, so that each time a new measured value is stored, the oldest measured value is deleted.

In one embodiment, the number of temporally successive measured values may form a or the temporally contiguous subset of the sensor data.

In one embodiment, a measured value may indicate a force and/or a torque.

It is (therefore) possible that the sensor units are force sensors and/or torque sensors. A sensor unit may accordingly be designed to output force values and/or torque values. In particular, it is possible that a plurality of sensor units are provided, wherein at least one force sensor and/or one torque sensor is or are provided, wherein the computing unit may be designed to switch the drive unit to an appropriate state (non-driving state or driving state) as a function of a curve of the sensor data from the force sensor and/or the torque sensor over time.

In one embodiment, the computing unit may be designed to switch the drive unit to the non-driving state if at least a first predetermined number of measured values do not lie outside a tolerance interval around the reference value, in particular if all the measured values of the subset lie within the tolerance interval around the reference value, and/or to switch the drive unit to a driving state if at least a first predetermined number of measured values, in particular at least one of the measured values of the subset, lie(s) outside the tolerance interval.

In one embodiment, the computing unit may be designed to switch the drive unit to the non-driving state if a statistical measure of the spread of the measured values lies within a tolerance interval around the reference value, and/or to switch the drive unit to a driving state if a statistical measure of the spread of the measured values lies outside the tolerance interval.

In one embodiment, the computing unit may be designed to carry out the switching to the non-driving state by taking into account a plurality of, for example two, three, five or ten, successive subsets, wherein in particular the switching may be carried out if the measured values of at least one or of at least two or of all the subsets taken into account satisfy one of the aforementioned conditions.

A tolerance interval therefore indicates a window (or a kind of window), outside of which fewer than a first predetermined number of measured values should be located, in particular in which all the measured values in the considered period of time must be located in order for the signal from the sensor unit to be regarded as substantially static. If at least a first predetermined number of measured values, in particular at least one value, lie(s) outside this tolerance interval, it can be assumed that a dynamically changing force is acting on the sensor unit, i.e. a substantially dynamic signal is present. The touching of the sensor unit by a user on the stroller frame leads to a high variability of the forces recorded. Therefore, if a high degree of spread (for example variance or another statistical measure of the spread) is ascertained, it will be assumed that a human person is interacting with the stroller frame. If the force is substantially constant, there may be, for example, an object acting on the sensor. By way of example, this could be a jacket that is hung on the stroller frame.

In one embodiment, the computing unit may be designed to switch the drive unit to a driving state if at least a first predetermined number of measured values, in particular at least one of the measured values of the subset, lie(s) outside the tolerance interval.

In one embodiment, the computing unit is designed to permit a driving of the stroller frame by the drive unit in the driving state. It is therefore not necessarily the case that the drive is also actually active upon switching to the drive state. Rather, the actual activation may be dependent on further parameters, such as for example a magnitude of the average pushing force, a turning of at least one wheel or the like. Furthermore, the driving state may indicate that a user of the stroller frame can activate the drive device.

In one embodiment, it may be provided that, upon switching to the driving state, the computing unit is designed to activate the drive unit directly or else indirectly and/or to supply it with power. In this embodiment, the activation of the drive unit may comprise a driving of the stroller frame.

In another embodiment, the computing unit may be designed to switch the drive unit to the driving state if a statistical measure of the spread of the measured values lies outside the tolerance interval around the reference value.

In one embodiment, the computing unit may be designed to carry out the switching to the driving state by taking into account a plurality of, for example two, three, five or ten, successive subsets, wherein in particular the switching to the driving state may be carried out if the measured values of at least one or of at least two or of all the considered subsets satisfy one of the aforementioned conditions.

It is also possible that the drive unit drives the stroller frame upon ascertaining that a human person is interacting with the stroller frame. This means that the drive unit moves the stroller frame either in an assisting fashion or entirely.

The tolerance interval may be a force interval, wherein it has been found to be advantageous if a tolerance interval of at most ±30 Newtons, at most ±40 Newtons or at most ±100 Newtons around the reference value is considered.

In one embodiment, it is also possible that the tolerance interval is selected as a function of the reference value. For example, it is possible that the tolerance interval is at most ±5% of the reference value. In other embodiments, it is possible that the tolerance interval is at most ±10% of the reference value, at most ±20% of the reference value or at most ±50% of the reference value.

One subset of the sensor data, in particular the above, preferably temporally contiguous subset, may cover at least one interval, wherein each interval includes at least two measured values, wherein at least one of the at least two measured values, in particular all the measured values except for one, is recorded in a powered state of the drive unit, and wherein at least one of the at least two measured values, in particular exactly one measured value, is recorded in a non-powered state of the drive unit, wherein the computing unit is designed to switch the drive unit to the non-driving state if at least a first predetermined number of measured values of the subset recorded in the non-powered state of the drive unit do not lie outside a tolerance interval around the reference value, in particular if all the measured values of the subset recorded in the non-powered state of the drive unit lie within the tolerance interval around the reference value, and/or to switch the drive unit to a driving state if at least a first predetermined number, in particular at least one of the measured values of the subset recorded in the non-powered state of the drive unit, lie(s) outside the tolerance interval.

One subset of the sensor data, in particular the above, preferably temporally contiguous subset, may cover at least one interval, wherein each interval includes at least two measured values, wherein at least one of the at least two measured values, in particular all the measured values except for one, is recorded in a powered state of the drive unit, and wherein at least one of the at least two measured values, in particular exactly one measured value, is recorded in a non-powered state of the drive unit, wherein the computing unit is designed to switch the drive unit to the non-driving state if a statistical measure of the spread of the measured values of the subset recorded in the non-powered state of the drive unit lie within a tolerance interval around the reference value, and/or to switch the drive unit to a driving state if a statistical measure of the spread of the measured values of the subset recorded in the non-powered state of the drive unit lies outside the tolerance interval.

In one embodiment, the stroller frame may include a pusher portion, which may be designed to be used by a user for pushing the stroller frame. In one embodiment, the sensor unit may be arranged on the pusher portion in such a way as to make contact with the hand of a user when the latter has one hand on the pusher portion.

The sensor unit may therefore be arranged in such a way that it can make direct contact with the hand of a user. Reliable detection of the interaction of the user with the stroller frame is thus provided.

In a further embodiment, the sensor unit may be arranged on a connecting portion that connects the pusher unit to a framework of the stroller frame. In this case, the sensor unit may be designed to measure a force that acts on the framework from the pusher portion.

With the embodiment described above, it is possible to prevent direct interaction of the sensor unit with the user, so that damage caused by incorrect operation can be prevented.

The drive unit may be designed in various ways. By way of example, the drive unit may comprise an electric motor and a brake, wherein the braking unit or the brake is activated by the computing unit when the drive unit is switched to the non-driving state. In a further embodiment, however, it is also conceivable that, if the drive unit comprises an electric motor, the electric motor is activated as a generator and/or is used as a brake, in particular as a regenerative brake, wherein the regenerative brake is designed to deliver electrical energy to an accumulator. This has the advantage that possibly no further brake and no further braking process is necessary in addition to the motor.

In one embodiment, the stroller frame may comprise at least three wheels, wherein the drive unit may be arranged and designed in such a way as to drive and/or lock at least one of the wheels.

The stroller frame can be designed differently. Three-wheel, but also four-wheel configurations can be provided. A very versatile solution is thus provided.

In one embodiment, the stroller frame may comprise a framework, on which the pusher portion and/or at least three wheels can be arranged.

The pusher portion and the wheels may be attached to a framework, which gives the stroller frame stability.

In one embodiment, the pusher portion may be designed to be connectable to the framework via a connecting element and/or a connecting portion, wherein the sensor unit may be arranged on the connecting element or the connecting portion.

It is therefore possible to detect the interaction of a user with the pusher portion in an indirect manner via a force between the pusher portion and the framework.

In one embodiment, the framework may include at least one hinge portion, wherein the pusher portion may be designed to be rotatable around the hinge portion.

In order to fold up the stroller frame and thus achieve a compact carrying size, the pusher portion may be designed to be foldable. To this end, the pusher portion can be rotated around the hinge portion.

In one embodiment, the sensor unit may be arranged in the hinge portion.

It is therefore conceivable that an interaction of a user with the stroller frame can be detected in an indirect manner via a torque that is measured in the hinge portion. This provides a further possible way of ascertaining the interaction. Arranging the sensor unit in the hinge portion has the advantage of being able to select a compact size and a secure arrangement in a manner protected from external influences. In addition, there is therefore no need for complicated wiring of the pusher portion.

In one embodiment, the framework may be designed to be foldable from an unfolded configuration to a folded configuration, in particular using the hinge portion.

In one embodiment, the sensor unit may be communicatively and/or electrically connected to the drive unit and/or the computing unit in a/the unfolded configuration of the framework, and/or the sensor unit may not be communicatively and/or electrically connected to the drive unit and/or the computing unit in a/the folded configuration of the framework.

In one embodiment, the unfolded configuration may be a fully unfolded configuration or a partially unfolded configuration. In one embodiment, the folded configuration may be a fully folded configuration or a partially folded configuration.

The drive device can easily be deactivated by folding the stroller frame or the framework.

The object is also achieved by a stroller comprising a stroller frame as described above.

Advantages similar or identical to those that have already been described in connection with the stroller frame are achieved.

The object is also achieved in particular by a computer-readable storage medium, containing instructions which cause at least one processor to implement the following steps when the instructions are executed by a processor:
  providing and/or receiving sensor data;
  determining a reference value for the sensor data;
  providing and/or receiving (at least) one measured value;
  determining a control command for a drive unit, in particular for a drive unit of a stroller and/or of a stroller frame, in particular as described above, using the sensor data and the reference value.

The object is also achieved in particular by a method for determining a control command, comprising the following steps:
  providing and/or receiving sensor data;
  determining a reference value for the sensor data;
  providing and/or receiving (at least) one measured value;
  determining a control command for a drive unit, in particular for a drive unit of a stroller and/or of a stroller frame, as described above, using the sensor data and the reference value.

In one embodiment, the control command may be designed as a command for switching to the non-driving state and/or braking state if at least a first predetermined number of measured values do not lie outside a tolerance interval around the reference value, in particular if all the measured values of a subset lie within a tolerance interval around the reference value, and/or if a statistical measure of the spread of the measured values of a subset lies within a tolerance interval around the reference value.

In one embodiment, the control command may be designed as a driving command if at least a first predetermined number of measured values, in particular at least one measured value of a subset and/or a statistical measure of the spread of the measured values of a subset, lie(s) outside a tolerance interval around the reference value.

Advantages similar or identical to those that have already been described in connection with the stroller frame are achieved.

The object is also achieved in particular by a computer-readable storage medium, containing instructions which cause at least one processor to implement a method as described above when the instructions are executed by the at least one processor.

Advantages similar or identical to those that have already been described in connection with the method are achieved.

Further embodiments will become apparent from the dependent claims.

The invention will be explained in greater detail below on the basis of exemplary embodiments. In the figures.

Hereinbelow, the same reference signs will be used for parts that are identical or that have the same function.

Figure 1:
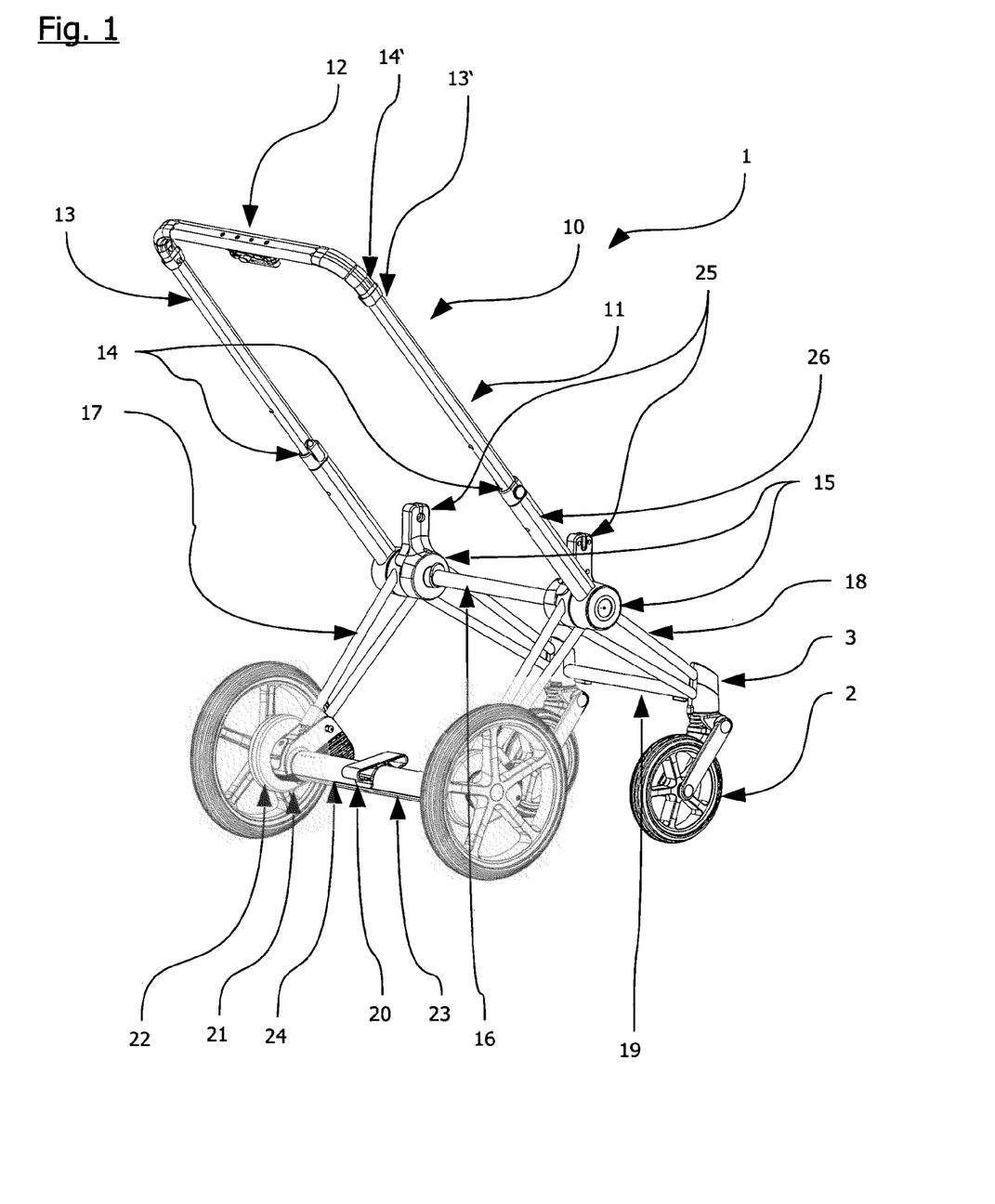
FIG. 1 shows a schematic illustration of a stroller frame.

FIG. 1 shows a stroller 1, which has four wheels 2. Two front wheels 2 are connected to the stroller 1 via respective wheel mounts 3 with a front wheel suspension 18. In the front region of the stroller 1, a front wheel strut 19 is arranged between the wheel mounts 3 in order to stabilize the wheels 2 on the stroller 1.

The wheel mounts 3 of the front wheels 2 are connected to an adjusting device 15 via a front wheel suspension 18. The adjusting device 15 is arranged above the front wheels 2 and offset toward the rear. Also arranged on the adjusting device 15 is a rear wheel suspension 17, on which two rear wheels are arranged on a rear wheel axle 24. A parking brake 20, which is designed such that it can be operated by a foot, is arranged approximately in the middle of the rear wheel axle. The parking brake 20 is designed to lock the rear wheels. These can only be brought back into motion again by releasing the parking brake 20.

In the exemplary embodiment shown, two electric motors 21 for driving the rear wheels are arranged at the ends of the rear wheel axle 24. In other exemplary embodiments, however, it is also conceivable that a single motor drives both wheels via a shaft and/or a transmission.

In the exemplary embodiment shown in FIG. 1, the rear wheel axle 24 is designed as a hollow cylinder; arranged in the rear wheel axle 24 is an accumulator 23, which is electrically connected to the electric motors 21. Alternatively, the rear wheel axle 24 may also be designed as a strut, and the accumulator 23 may be designed to lie therebelow, even partially. Control electronics may additionally be arranged in or on the rear wheel axle 24, which control electronics are designed to control the functions of the motors 21.

Also arranged on the adjusting device 15 are retaining devices 25, which are designed to receive an accommodating means (for example a seat shell, a seat unit or a carrycot).

The adjusting devices 15 are connected to each other via a transverse strut 16 in order to ensure the stability of the device as a whole. Also arranged on the adjusting devices 15 are pusher receiving devices 26, which extend upward and rearward at an angle and are connected to a pusher device via connecting elements 14. The pusher device consists of two side struts 13, 13', which are displaceably arranged in the pusher receiving device 26. The side struts 13, 13' can be fixed in position via the connecting elements 14. Arranged at the end of the side struts 13, 13' is a pusher portion 12, onto which a user can grip for pushing the stroller 1.

Figure 2:
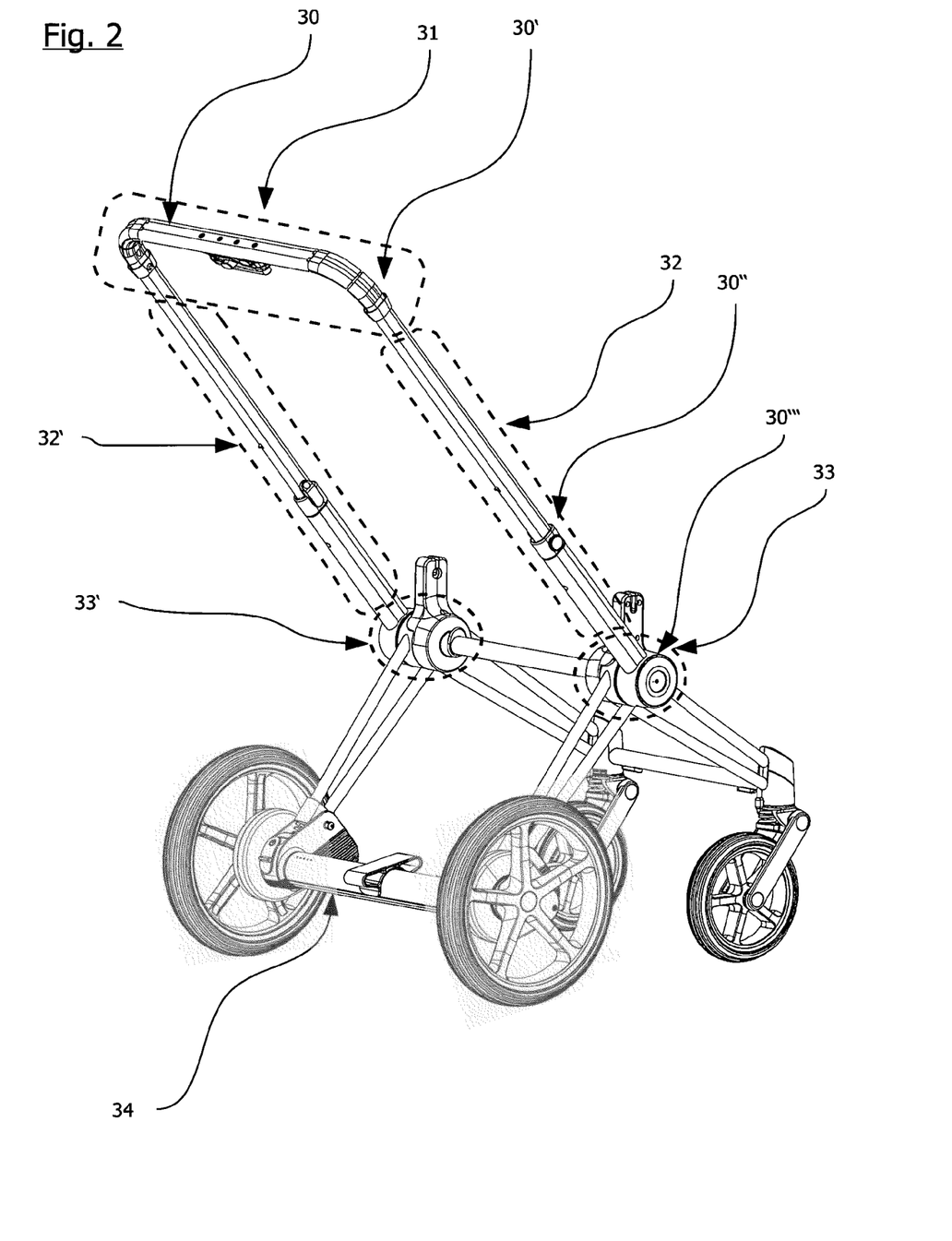
FIG. 2 shows a schematic illustration of different possible arrangements of sensor units.

FIG. 2 shows different possible ways of arranging sensor units 30, 30', 30'', 30''' on the stroller 1. For instance, FIG. 2 shows a first sensor region 31, which in the exemplary embodiment shown comprises the pusher portion of the stroller 1. Force sensors 30, 30' may be arranged in the first sensor region 31. The force sensor 30 may be a sensor which is designed to measure a force. The force sensor 30 therefore outputs a signal that can be converted into a force.

In the exemplary embodiment shown, the force sensor 30 is arranged in the first sensor region 31 in the pusher portion of the stroller 1 in such a way that an interaction with a user of the stroller 1 can be detected. In one exemplary embodiment, the force sensor 30 is integrated in the pusher portion 12, with a contact surface of the force sensor 30 being oriented such as to point toward the operator of the stroller 1.

Besides mounting a sensor unit 30 in the pusher portion, it is also possible, in a further exemplary embodiment, to arrange force sensors 30' in a connecting region where the pusher portion 12 is connected to side struts 13, 13' of the stroller 1. In this case, the pusher portion 12 may be displaceably arranged in the side struts 13, 13' and may be fixed in position via a fastening element or connecting element 14'. In order to measure forces applied to the pusher portion 12 by a user, a sensor unit, for example a force sensor 30', may be arranged in the connecting element 14'. A force sensor 30, 30' may also be designed in an elongate manner and may thus cover both a region of the pusher portion 12 and also of the connecting region.

FIG. 2 also shows, in a superimposed manner, a second exemplary embodiment in which a sensor unit 30'' is arranged in a connecting element of the side struts 13, 13'.

In another exemplary embodiment, a sensor unit 30''' is arranged in a third sensor region 33 or 33' on the adjustment device 15. This is preferably a torque sensor 30'''. The torque sensor 30''' is designed to measure a torque caused by a force exerted on the pusher portion 12 or the side struts 13, 13' by the user.

Arranged in the rear wheel axle 24 is a computing unit 34, which is communicatively connected to the sensor units 30, 30', 30'', 30'''. The computing unit 34 is designed to receive and to process sensor data generated by the sensor units 30, 30', 30'', 30'''. The processing of the data is shown in detail in FIGS. 3 and 4.

Figure 3:
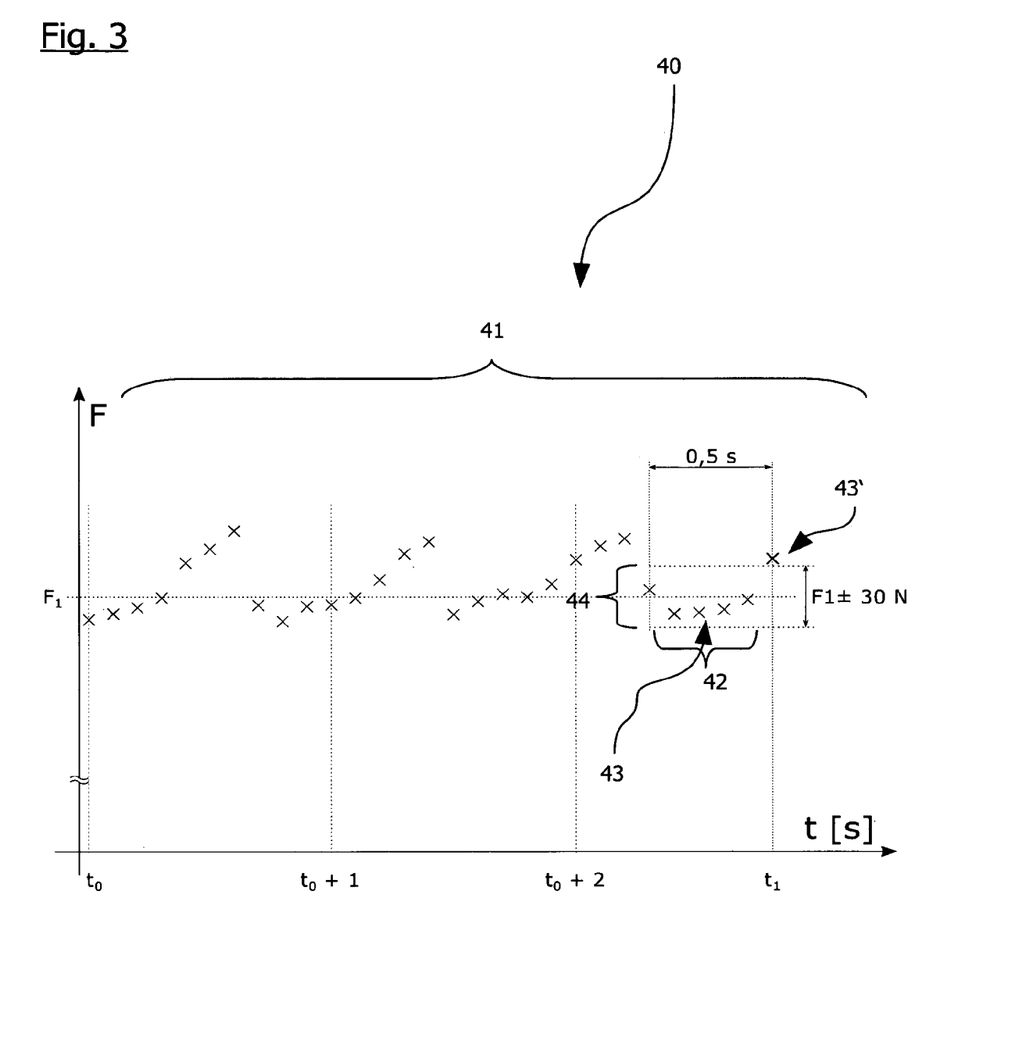
FIG. 3 shows a graph displaying exemplary sensor data.

FIG. 3 shows a signal curve of a force sensor 30, 30', 30'', which is illustrated by a force diagram 40 over time. The time T[s] is plotted on the X axis, and the force F is plotted on the Y axis. A plurality of measured values 43, detected by a sensor unit 30, 30', 30'', are plotted on the force diagram 40. The measured values 43 together form sensor data 41.

The times $t_0$, $t_{0+1}$, $t_{0+2}$ and $t_1$ are plotted on the X axis. In order to ascertain whether a person has his hand on the stroller 1, the computing unit 34 is designed to consider a temporally contiguous range of measured values 42. By way of example, FIG. 3 shows a subset of sensor data 42 for a period of time of 0.5 seconds.

In order to determine whether a current measured value 43' at the time $t_1$ indicates an interaction of a user with the stroller 1, a reference value F1 is calculated for the measured values 42 situated in a time interval before the measured value 43', said reference value indicating a mean of the sensor values in the time interval. In addition, a tolerance interval 44 is set around the reference value F1. In the exemplary embodiment of FIG. 3, the tolerance interval 44 is set as ±30 Newtons in relation to the reference value F1.

When processing the measured value 43', it is then checked whether this measured value is within the tolerance interval 44. As shown in FIG. 3, the current measured value 43' is outside the tolerance interval 44. This means that the force has significantly increased in comparison to the preceding values. From this, it can be deduced that a user is interacting with the stroller 1. The measured value 43' thus indicates that the stroller 1 is being pushed or held by a person.

The computing unit 34 described in connection with FIGS. 1 and 2 is designed to switch a motor 21 to a driving state in response to the finding that the measured value 43' lies outside the tolerance interval 44. This means that the motor drives a stroller frame or a stroller 1.

In other embodiments which require a plurality of measured values (for example 2 or 3 or 5 measured values) of a subset outside the tolerance interval, the same data could lead to the motor being switched into a non-driving state. Essentially, however, the following applies: By visualizing a force curve belonging to the measured values, it can be seen that if, for example, the sampling frequency is tripled, more than one measured value, probably around 3 measured values, will lie outside the tolerance interval. It then makes sense either to extend the tolerance range or to set the first predetermined number to a value greater than 1.

In another exemplary embodiment, the computing unit 34 checks whether the measured values 42 are spreading out. This means that the computing unit is designed to calculate a statistical measure of the spread. In the example of FIG. 3, the computing unit 34 may be designed to calculate the variance of the measured values 42. If the calculated variance is outside a tolerance range, the motor 21 will be switched to the driving state by the computing unit 34. In the last-mentioned example, the switching therefore depends not on one single measured value, but rather on the ratio between the measured values in an interval. As a result, a more robust detection of the user interaction can be carried out.

Figure 4:
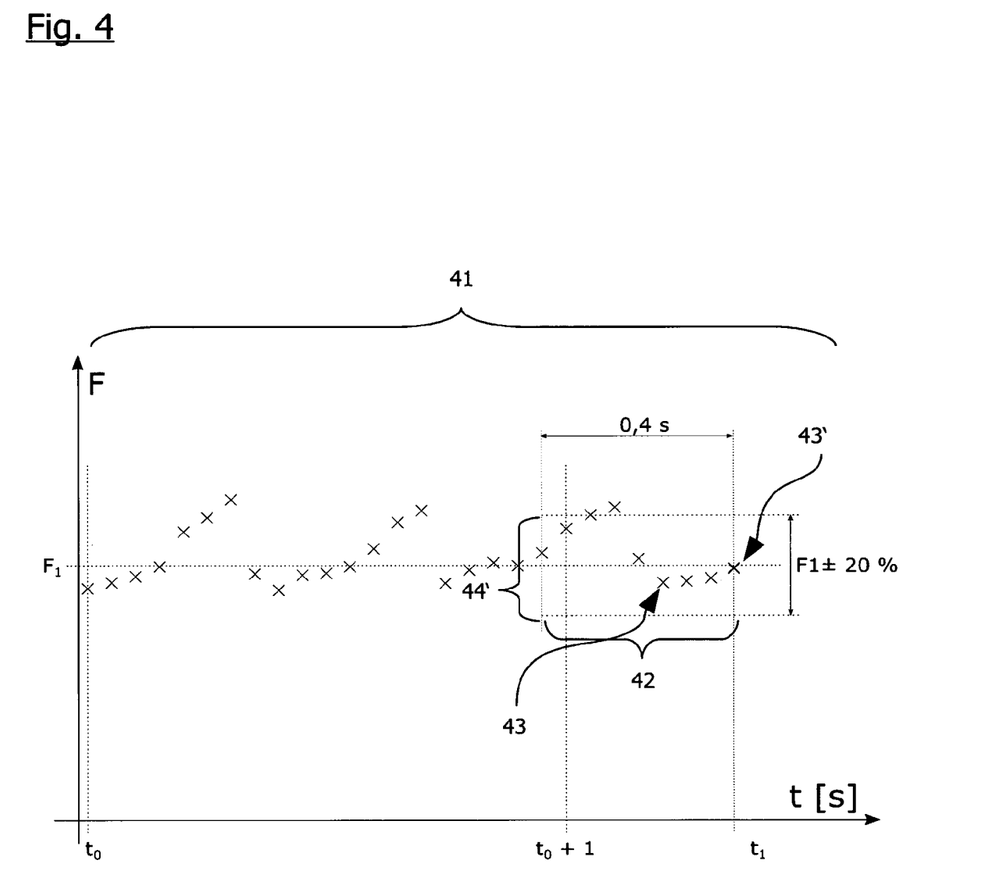
FIG. 4 shows a further graph displaying sensor data in another exemplary embodiment.

FIG. 4 shows an example in which the motor 21 will be switched to a driving state. FIG. 4 likewise shows a force diagram 41, in which forces are plotted on the Y axis and times are plotted on the X axis. A number of measurement points 43 are shown in the force diagram 41. As already described in connection with FIG. 3, a reference value F1 is determined for a specified time interval prior to a measured value 43' currently being measured. In the exemplary embodiment shown in FIG. 4, the time interval is 0.4 seconds. The sampling frequency at which the sensors record the measured values 43 is 20 Hz. Similar to the description of FIG. 3, a tolerance interval 44' is set around the reference value F1. In the exemplary embodiment of FIG. 4, the limits of the tolerance interval 44' are selected in such a way that they correspond to ±20% of the value of the reference value F1. The tolerance interval therefore adapts dynamically to the reference value F1.

In the exemplary embodiment shown in FIG. 4, the measured value 43' currently being measured lies within the tolerance interval 44'. However, (at least) one value in the time interval lies outside the tolerance interval, and therefore the computing unit 34 determines that the motor must be switched to a driving state since a sufficiently variable force and/or a sufficiently variable torque is acting on the sensor unit, so that it is highly likely that a person is interacting with the stroller 1.

In a manner analogous to the example described above, the computing unit 34 may also calculate whether the variance of the measured values 42 of an interval lies within a tolerance interval 44'. The computing unit 34 is designed to switch the motor to a non-driving state or braking state if the variance of the measured values in a time interval lies within a tolerance interval 44'.

In another exemplary embodiment, which is not shown, it is conceivable that the sensor unit is designed to detect a force or a torque at a frequency of 50 Hz. After a certain number of measurements, for example after 5 measurements (in general: after n measurements, where n should be between 2 and 100 or between 2 and twice the measurement frequency specified in Hertz; in the context of this application, it is provided that every single integer value n between 2 and 100 and every integer value between 2 and twice the measurement frequency specified in Hertz is covered by this disclosure), the power to the motor 21 is interrupted for one measurement. Once measured values have been recorded without power to the motor 21 in at least 5, preferably 3, intervals, a mean value (for example the arithmetic mean) of the values in the non-powered state is formed. If at least a first predetermined number of measured values in the non-powered state do not lie outside a tolerance interval around the mean value (the arithmetic mean), i.e. a reference value, in particular if all the measured values in the non-powered state lie within a tolerance interval around the mean value, then the motor 21 is switched to a non-driving state or braking state.

If at least a first predetermined number of measured values, in particular at least one value, lie(s) outside the tolerance interval, for example ±25 Newtons, then it is ascertained that it is highly likely that a user is interacting with the stroller 1, and the motor 21 is switched to a driving state. To calculate the arithmetic mean, the absolute values of the measured values are determined and used.

In a manner analogous to the example described above, it is also possible that the computing unit 34 calculates a statistical measure of the spread the variance for the values in the non-powered state. If the statistical measure of the spread (the variance) lies within a tolerance interval, the motor 21 is switched to the non-driving state. If the statistical measure of the spread (the variance) lies outside a tolerance interval, the motor 21 is switched to the driving state by the computing unit 34.

In a fourth exemplary embodiment, which is likewise not shown, a second tolerance interval around the reference value can be defined, for example ±15 Newtons. The second tolerance interval thus lies inside the first tolerance interval. If at least a second predetermined number of measured values in the non-powered state do not lie outside the second tolerance interval, in particular if all the measured values in the non-powered state lie within the second tolerance interval, then the brake is actively actuated (in addition to switching the motor 21 to a non-driving state).

Figure 5:
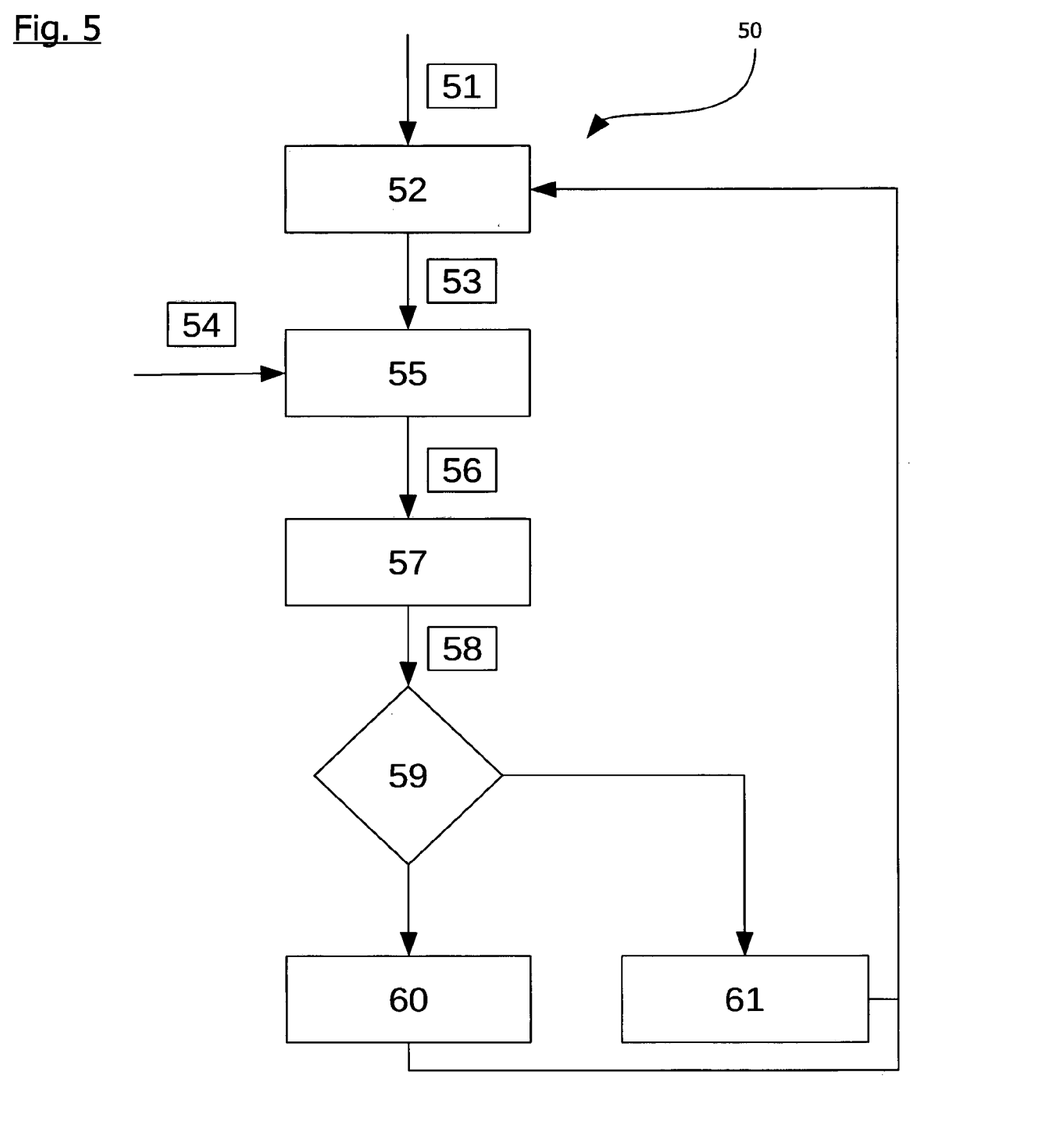
FIG. 5 shows a flow diagram of a method for determining a control command.

FIG. 5 shows a flow diagram 50 which illustrates the method for determining whether an operator is interacting with a stroller frame. First, in a determination step 52, sensor data are received and processed. In the determination step, a reference value 53 is calculated, which can indicate for example a mean value of the sensor data 51.

In the subsequent comparison step 55, a current measured value 54 is received and is compared with the reference value. In the interval determination step 57, a tolerance interval is set around the reference value. For this, the value of the reference value can be taken into account. This means that a large tolerance interval will be determined in the case of a large reference value and a small tolerance interval will be determined in the case of a small reference value.

In addition, the gap 58 between the current measured value 54 and the interval limits is determined. In the checking step 59, it is checked whether the current measured value 54 or at least one of the other measured values of the considered time interval lies outside the tolerance interval (in general: whether in total at least a first predetermined number of measured values in the considered time interval lie outside the tolerance interval). If the current measured value 54 and all the other measured values in the considered time interval lie within the tolerance interval (in general: if fewer than a first predetermined number of measured values in the considered time interval lie outside the tolerance interval), then a motor of the stroller is switched to a non-driving state in the braking step 61. In one exemplary embodiment, the motor is switched to a braking state so that the stroller 1 stops. If it is ascertained that the current measured value 54 or at least one of the other measured values in the considered time interval lies outside the tolerance interval (in general: if in total at least a first predetermined number of measured values in the considered time interval lie outside the tolerance interval), then a motor is switched to a driving state so that the stroller can be driven entirely or in an assisted fashion by the motor.

The invention also explicitly encompasses the scenario where the computing unit is embodied by a server communicatively connected to the stroller frame or stroller. For example, only the sensor data can be transmitted to the server via a communication device, wherein all the calculation steps are carried out on the server and control commands to the stroller and/or the communication device are sent back.

LIST OF REFERENCE SIGNS

1 stroller
2 wheel
3 wheel mount
10 stroller frame
11 framework
12 pusher portion
13, 13' side struts
14, 14' connecting element
15 adjusting device
16 transverse strut
17 rear wheel suspension
18 front wheel suspension
19 front wheel strut
20 parking brake
21 motor
22 braking device
23 accumulator
24 rear wheel axle
25 retaining devices
26 pusher receiving devices
31 first sensor region
32, 32' second sensor region
33, 33' third sensor region
34 computing unit
30, 30', 30" force sensor
30''' torque sensor
40 force diagram
41 sensor data
42 subset of the sensor data
43, 43' measured value
44 tolerance interval
50 flow diagram
51 sensor data
52 determination step
53 reference value
54 current measured value
55 comparison step
56 deviation
57 interval determination step
58 gap to interval limit
59 checking step
60 driving step
61 braking step
F1 mean value
F force axis
T[s] time axis
$t_0$ first measurement time
$t_1$ current measurement time
S1 non-driving state/braking state
S2 driving state

The invention claimed is:

1. A stroller frame, comprising:
a sensor unit for capturing sensor data at a sampling frequency; and
a drive unit; and
a computing unit coupled to the sensor unit and coupled to the drive unit,
wherein the computing unit is configured to switch the drive unit between a driving state and a non-driving state as a function of a comparison of the sensor data and a tolerance interval,
wherein the computing unit is configured to switch the drive unit to the non-driving state if fewer than a predetermined number of temporally contiguous measured values of a subset of the sensor data are not within the tolerance interval and configured to switch the drive unit to the driving state if a predetermined number of the temporally contiguous measured values of the subset are within the tolerance interval; or
wherein the computing unit is configured to switch the drive unit to the non-driving state if a statistical measure of a spread of the measured values of the sensor data is within the tolerance interval and configured to switch the drive unit to the driving state if the statistical measure of the spread of the measured values is outside the tolerance interval.

2. The stroller frame according to claim 1, wherein the computing unit is configured to determine a reference value based on a temporally contiguous subset of the sensor data.

3. The stroller frame according to claim 2, wherein the reference value corresponds to a mean value, a trimmed mean, a harmonic mean, or a weighted harmonic mean.

4. The stroller frame according to claim 1, wherein the sensor data corresponds to a force or a torque.

5. The stroller frame according to claim 1,
wherein a temporally contiguous subset of the sensor data covers at least one interval,
wherein each interval includes at least two measured values,
wherein at least one of the at least two measured values corresponds to the driving state of the drive unit, and
wherein at least one of the at least two measured values corresponds to the non-driving state of the drive unit, wherein the computing unit is configured to switch the drive unit to the non-driving state if fewer than a predetermined number of measured values of a subset of the sensor data are not within the tolerance interval and configured to switch the drive unit to the driving state if the predetermined number of measured values of the subset are within the tolerance interval.

6. The stroller frame according to claim 1,
wherein a temporally contiguous subset of the sensor data covers at least one interval,
wherein each interval includes at least two measured values,
wherein at least one of the at least two measured values corresponds to the driving state of the drive unit, and
wherein at least one of the at least two measured values corresponds to the non-driving state of the drive unit,
wherein the computing unit is configured to switch the drive unit to the non-driving state if a statistical measure of the spread of the measured values of the subset recorded in the non-driving state is within the tolerance interval and configured to switch the drive unit to a driving state if the statistical measure of the spread of the measured values of the subset recorded in the non-driving state is outside the tolerance interval.

7. The stroller frame according to claim 1, comprising a pusher portion configured for pushing the stroller frame.

8. The stroller frame according to claim 7, wherein the sensor unit is coupled to the pusher portion.

9. The stroller frame according to claim 1, wherein the drive unit comprises one or both of a braking device and an electric motor.

10. The stroller frame according to claim 1, comprising at least three wheels, wherein the drive unit is configured to drive or lock at least one of the at least three wheels.

11. The stroller frame according to claim 1, comprising a framework having one or both of a pusher portion and at least three wheels.

12. The stroller frame according to claim 1, further comprising a framework coupled to a pusher portion by a connecting element or by a connecting portion, wherein the sensor unit is coupled to the connecting element or the connecting portion.

13. The stroller frame according to claim 12, wherein the framework includes at least one hinge portion, wherein the pusher portion is configured to rotate about the hinge portion.

14. The stroller frame according to claim 13, wherein the sensor unit is arranged in the hinge portion.

15. The stroller frame according to claim 14, wherein the framework is configured to have an unfolded configuration and a folded configuration.

16. The stroller frame according to claim 15, wherein the sensor unit is communicatively or electrically connected to the drive unit or the sensor unit is communicatively or electrically connected to the computing unit in the unfolded configuration and wherein the sensor unit is decoupled from the drive unit or the computing unit in the folded configuration.

17. A stroller comprising a stroller frame according to claim 1.

18. A non-transitory computer-readable storage medium, containing instructions which cause at least one processor to implement the following when the instructions are executed: accessing sensor data; determining a reference value for the sensor data; accessing a measured value; and determining a control command for a drive unit of a stroller using the sensor data and the reference value, wherein the control command is configured to: switch the drive unit to a non-driving state if fewer than a predetermined number of temporally contiguous measured values of a subset of the sensor data are not within a tolerance interval and configured to switch the drive unit to a driving state if a predetermined number of the temporally contiguous measured values of the subset are within the tolerance interval; or wherein the control command is configured to: switch the drive unit to the non-driving state if a statistical measure of a spread of the measured values of the sensor data is within the tolerance interval and configured to switch the drive unit to the driving state if the statistical measure of the spread of the measured values is outside the tolerance interval.

19. A method for determining a control command, comprising: accessing sensor data; determining a reference value for the sensor data; accessing a measured value; determining a control command for a drive unit of a stroller using the sensor data and the reference value, wherein the control command is configured to: switch the drive unit to a non-driving state if fewer than a predetermined number of temporally contiguous measured values of a subset of the sensor data are not within a tolerance interval and configured to switch the drive unit to a driving state if a predetermined number of the temporally contiguous measured values of the subset are within the tolerance interval; or wherein the control command is configured to: switch the drive unit to the non-driving state if a statistical measure of a spread of the measured values of the sensor data is within the tolerance interval and configured to switch the drive unit to the driving state if the statistical measure of the spread of the measured values is outside the tolerance interval.

20. The method for determining a control command according to claim 19, wherein the control command corresponds to an instruction for switching to a non-driving state or a braking state if fewer than a predetermined number of measured values of a subset of sensor data are not within a tolerance interval around the reference value or if all the measured values of the subset or a statistical measure of the spread of the measured values of the subset is within the tolerance interval around the reference value.

21. The method for determining a control command according to claim 19, wherein the control command corresponds to an instruction for a driving command if at least a predetermined number of measured values of sensor data or at least one measured value of a subset or a statistical measure of the spread of the measured values of the subset of sensor data is outside a tolerance interval around the reference value.

22. A non-transitory computer-readable storage medium, containing instructions which cause at least one processor to implement a method according to claim 19 when the instructions are executed.

* * * * *

UNITED STATES PATENT AND TRADEMARK OFFICE
CERTIFICATE OF CORRECTION

| | | |
|---|---|---|
| PATENT NO. | : 12,296,883 B2 | Page 1 of 1 |
| APPLICATION NO. | : 17/597650 | |
| DATED | : May 13, 2025 | |
| INVENTOR(S) | : Jiri Spour | |

It is certified that error appears in the above-identified patent and that said Letters Patent is hereby corrected as shown below:

In the Claims

In Column 13, Line 62, in Claim 18, after "containing", delete a linebreak

Signed and Sealed this
Thirteenth Day of January, 2026

John A. Squires
*Director of the United States Patent and Trademark Office*